No. 696,507. Patented Apr. 1, 1902.
S. STERNAU & L. STRASSBURGER.
ALCOHOL LAMP.
(Application filed Oct. 30, 1901.)
(No Model.)
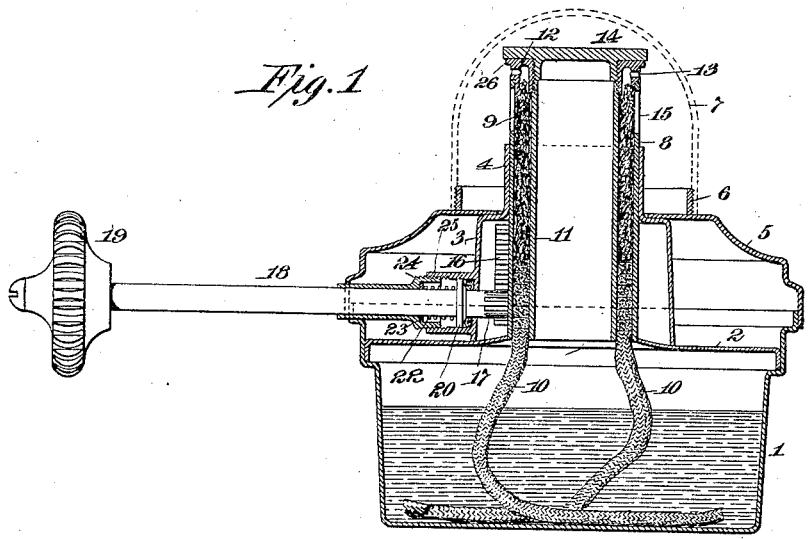
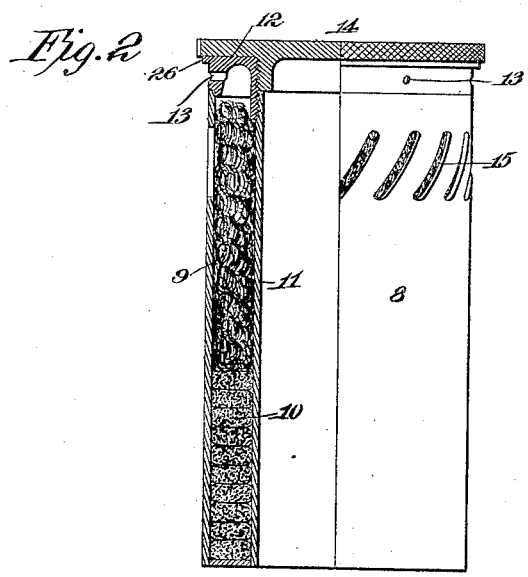
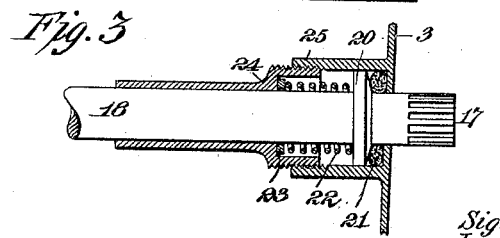
Witnesses:
Jas. F. Coleman
Jno. Robt. Taylor
Inventors
Sigmund Sternau
Lionel Strassburger
by Dyer Edmonds & Dyer
Attorneys
THE NORRIS PETERS CO., PHOTO-LITHO., WASHINGTON, D. C.

UNITED STATES PATENT OFFICE.

SIGMUND STERNAU AND LIONEL STRASSBURGER, OF NEW YORK, N. Y., ASSIGNORS TO S. STERNAU & CO., OF NEW YORK, N. Y., A COPARTNERSHIP.

ALCOHOL-LAMP.

SPECIFICATION forming part of Letters Patent No. 696,507, dated April 1, 1902.

Application filed October 30, 1901. Serial No. 80,494. (No model.)

*To all whom it may concern:*

Be it known that we, SIGMUND STERNAU and LIONEL STRASSBURGER, citizens of the United States, residing in the borough of Manhattan, city of New York, State of New York, have invented a certain new and useful Improvement in Alcohol-Lamps, of which the following is a description.

Our invention relates to new and useful improvements in alcohol-lamps of the type described and claimed in application for Letters Patent filed March 14, 1900, by John P. Steppe, of New York city, and numbered serially 8,589. The lamp embodied in said application employs a font from the top of which extends a wick-tube containing a wick-like material which dips into the alcohol in the font, said wick-tube carrying a burner-tube at its upper end, the latter being filled with asbestos or similar non-combustible absorbent material and formed on its exterior with openings disclosing the absorbent filling and permitting combustion of the alcohol. In order to regulate the flame with said prior lamp, a regulating-tube is used relatively movable with respect to the burner-tube, so as to cover or disclose the openings therein, the extreme closing movement of the regulating-tube with respect to the burner-tube cutting off a series of gas-vents formed in a cap at the top of the burner-tube and through which the alcohol will be consumed in gaseous form after the main openings have been covered to give a very low flame. In order to fill the font of the lamp of said application, a filling-tube is mounted concentrically within the burner and wick tubes, being provided at its upper end with a closing-cap. With the specific form of lamp shown in said application the burner and wick tubes are rigidly carried by the font and the regulating-tube is movable up and down to adjust the size of the flame, so that in consequence the lamp will be always of a definite height from its base to the top of the burner. Furthermore, with the prior construction since a movable regulating-tube is used special provision is made for accommodating any unconsumed alcohol which may flow out of the burner within the space between the burner-tube and the regulating-tube, and in the application in question this alcohol is permitted to flow into a receiving-chamber below the font, from which it is removed by an auxiliary wick leading to the burner.

Our present invention presents certain improvements in the construction of the prior lamp by which its cost will be reduced, its efficiency increased, and the general compactness and appearance of the device improved. To this end the present lamp comprises a suitable font, from which extends a permanently-located regulating-tube. Mounted within the regulating-tube so as to be vertically movable therein is a combined wick and burner tube, the upper end of which is formed with suitable burner-openings and carrying a cap having gas-vents therein. The wick and burner tube is also formed on its interior with a filling-tube closed by a suitable cap. The upper portion of the wick and burner tube is filled with a non-combustible absorbent material, such as asbestos, and the lower portion thereof contains a wick, which dips into the alcohol. Improved mechanism is employed for raising and lowering the wick and burner tube, so as to move the same relatively to the regulating-tube, and thereby cut off the burner-openings and also eventually the gas-vents. This makes the construction somewhat simpler than that of the prior application, and since the burner, when the flame has been extinguished, will be in a depressed position the vertical height of the lamp will be reduced to a minimum. Furthermore, since a stationary regulating-tube is used which makes a perfectly tight joint with the top of the font any unconsumed alcohol in the burner will simply flow through the regulating-tube into the font, and hence no special devices will be required to accommodate the same.

In order that the invention may be better understood, attention is directed to the accompanying drawings, forming part of this specification, in which—

Figure 1 is a sectional view of the improved lamp; Fig. 2, an enlarged detail view of the wick and burner tube and the filling-tube therein, and Fig. 3 an enlarged detail view showing the special packing employed for the shaft of the regulating device.

In all of the above views corresponding parts are represented by the same numerals of reference.

The body 1 of the lamp is provided with a partition 2, forming a font beneath it for containing the alcohol. Extending up from the partition 2 is a regulating-tube 3, having a contracted or reduced upper portion 4. The body 1 is provided with a top 5, which fits tightly around the regulating-tube immediately above the shoulder thereon, and said top is preferably provided with a threaded sleeve 6, onto which a cap 7 is screwed when the lamp is out of use to prevent evaporation of the alcohol. Mounted within the regulating-tube 3 and guided at its top by the reduced portion 4 thereof and fitting closely at its bottom in an opening in the partition 2 is a wick and burner tube 8. The wick and burner tube is provided at its upper portion with a filling 9, of asbestos or other suitable non-combustible absorbent material, and at its lower portion with one or more wicks 10, which extend through the bottom of the wick and burner tube and dip into the alcohol in the font. Within the wick and burner tube is a filling-tube 11, and the space between the filling-tube and the wick and burner tube is filled with the asbestos packing 9 and the wick-like material 10, as shown. Screwed onto the outside of the filling-tube at its top is a ring 12, formed with outwardly-opening gas-vents 13 therein, and engaging the threads of this ring is a cap 14, which closes the top of the filling-tube. The wick and burner tube is provided near its upper end with a series of burner-openings 15, which preferably are in the form of elongated slots inclined from the perpendicular and arranged in a horizontal series. In order to move the wick and burner tube with respect to the regulating-tube, any suitable adjusting mechanism may be employed. We prefer, however, to carry a rack 16 on the wick and burner tube and to engage therewith a pinion 17 on a regulating-shaft 18, having a thumb-wheel 19 at its end, made, preferably, of vulcanite or other heat-insulating material. The shaft 18 is formed with a collar 20 thereon, which fits against a packing 21, surrounding the opening in the regulating-tube, and engaging said collar is a spiral spring 22, which forces a second packing-ring 23 against a sleeve 24, which surrounds the shaft, the latter packing-ring closing the space between said sleeve and the shaft. The sleeve 24 engages an interiorly-threaded nipple 25 on the regulating-tube, so that by adjusting said sleeve toward or away from the regulating-tube the pressure on the packings 21 and 23 can be properly regulated.

In operation the wick or wicks 10 absorb the alcohol and convey the latter to the asbestos packing 9, which becomes saturated. By turning the shaft 18 the burner-openings 15 will be disclosed above the regulating-tube and the flame can be started. By lowering the burner the burner-openings 15 will be gradually cut off by the upper end of the regulating-tube until the flame at said burner-openings is extinguished. The heat of the burner will, however, continue to vaporize the alcohol, which in gas form will be projected through the gas-vents 13 and there consumed. The final downward movement of the burner carries the gas-vents within the regulating-tube and engages a flange 26 on the ring 12 with the top of said tube, so as to extinguish the jets. If in practice any alcohol from the burner is unconsumed, it simply flows down through the burner-tube and into the font. After the burner has been lowered to its extinguished position the cap 7 may be screwed onto the ring 6 to prevent further volatilization of the alcohol.

It will thus be seen that the present lamp is somewhat simpler and is more compact and economical in construction than the lamp of said application, although it embodies the same principles as the prior lamp.

Having now described our invention, what we claim as new, and desire to secure by Letters Patent, is as follows:

1. In an alcohol-lamp, the combination of a font, a regulating-tube rigidly carried by the font, a burner supplied with alcohol from the font and movable toward and away from the regulating-tube, and means for moving said burner, substantially as set forth.

2. In an alcohol-lamp, the combination of a font, a regulating-tube rigidly carried by the font, a burner movable toward and away from the regulating-tube, a series of gas-vents at the top of the burner arranged to be covered by the downward movement of the burner in the regulating-tube, and means for moving said burner, substantially as set forth.

3. In an alcohol-lamp, the combination of a font, a regulating-tube rigidly carried by the font, a wick and burner tube movable within the regulating-tube, said wick and burner tube carrying an asbestos packing in its upper portion and a wick-like material in its lower portion which dips in the alcohol in the font, and means for moving said wick and burner tube, substantially as set forth.

4. In an alcohol-lamp, the combination of a font, a regulating-tube rigidly carried by the font, a wick and burner tube movable within the regulating-tube, said wick and burner tube carrying an asbestos packing in its upper portion and a wick-like material in its lower portion which dips in the alcohol in the font, means for moving said wick and burner tube, and a filling-tube mounted concentrically within the wick and burner tube, substantially as set forth.

5. In an alcohol-lamp, the combination of a font, a regulating-tube rigidly carried by the font, a wick and burner tube movable within the regulating-tube and communicating with the font, said wick and burner tube having burner-openings near its upper end arranged to be covered by the regulating-tube, a rack on the wick and burner tube within the regulating-tube, a pinion engaging said rack, and a shaft for rotating said pinion, substantially as set forth.

This specification signed and witnessed this 25th day of October, 1901.

SIGMUND STERNAU.
  LIONEL STRASSBURGER.

Witnesses:
 THOS. F. BARRY,
 MAY I. HICKEY.